(12) United States Patent
Hoshino et al.

(10) Patent No.: US 12,555,864 B2
(45) Date of Patent: Feb. 17, 2026

(54) BATTERY COVER

(71) Applicant: SUBARU CORPORATION, Tokyo (JP)

(72) Inventors: Suharu Hoshino, Tokyo (JP); Takashi Hashimoto, Tokyo (JP); Toshiaki Naruke, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 472 days.

(21) Appl. No.: 18/097,927

(22) Filed: Jan. 17, 2023

(65) Prior Publication Data
US 2023/0246282 A1   Aug. 3, 2023

(30) Foreign Application Priority Data

Feb. 3, 2022   (JP) ................................. 2022-015677

(51) Int. Cl.
*H01M 50/271*   (2021.01)
*H01M 10/613*   (2014.01)
(Continued)

(52) U.S. Cl.
CPC ....... *H01M 50/271* (2021.01); *H01M 10/613* (2015.04); *H01M 10/6563* (2015.04); *H01M 50/367* (2021.01); *H01M 2220/20* (2013.01)

(58) Field of Classification Search
None
See application file for complete search history.

(56) References Cited

U.S. PATENT DOCUMENTS

2009/0197154 A1*   8/2009   Takasaki ............. H01M 10/625
                                                                 429/83
2012/0231306 A1*   9/2012   Herron ................ H01M 50/342
                                                                 429/53
(Continued)

FOREIGN PATENT DOCUMENTS

CN      112448079 A    3/2021
JP    2006-185894 A    7/2006
(Continued)

OTHER PUBLICATIONS

Japanese Office Action dated Nov. 25, 2025 in Japanese Patent Application No. 2022-015677 with machine English translation.

*Primary Examiner* — Nicole M. Buie-Hatcher
*Assistant Examiner* — Kenneth Max Otero
(74) *Attorney, Agent, or Firm* — McGinn IP Law Group, PLLC

(57) ABSTRACT

A battery cover for covering a battery stack stored in a battery pack includes a first cover member, a second cover member, a reinforcement, a gas exhaust passage, and an air exhaust passage. The first cover member covers the battery stack from above. The second cover member is joined to the first cover member from above. The reinforcement extends along a longitudinal direction of the battery stack, and is disposed between the first cover member and the second cover member. The gas exhaust passage is an air passage through which gas generated from the battery stack is to be discharged. The air exhaust passage is an air passage through which air that has exchanged heat with the battery stack is to be discharged. The gas exhaust passage and the air exhaust passage are provided in gaps among the first cover member, the second cover member, and the reinforcement.

20 Claims, 6 Drawing Sheets

(51) Int. Cl.
*H01M 10/6563* (2014.01)
*H01M 50/367* (2021.01)

(56) References Cited

U.S. PATENT DOCUMENTS

| | | |
|---|---|---|
| 2014/0205878 A1 | 7/2014 | Ohgitani et al. |
| 2019/0184831 A1* | 6/2019 | Yokoyama ........... B62D 25/087 |
| 2019/0288256 A1 | 9/2019 | Qin et al. |
| 2021/0074970 A1 | 3/2021 | Kim et al. |
| 2021/0167342 A1* | 6/2021 | Kwag ................. H01M 10/613 |
| 2022/0149478 A1* | 5/2022 | Egashira ............. H01M 50/224 |

FOREIGN PATENT DOCUMENTS

| | | |
|---|---|---|
| JP | 2013-120690 A | 6/2013 |
| JP | 2014-29797 A | 2/2014 |
| JP | 2014-139895 A | 7/2014 |
| JP | 2019-160774 A | 9/2019 |
| JP | 6688275 B2 | 4/2020 |
| WO | 2020/039626 A1 | 2/2020 |

* cited by examiner

BATTERY COVER

CROSS-REFERENCE TO RELATED APPLICATIONS

The present application claims priority from Japanese Patent Application No. 2022-015677 filed on Feb. 3, 2022, the entire contents of which are hereby incorporated by reference.

BACKGROUND

The disclosure relates to a battery cover.

As a related battery pack, for example, a structure according to Japanese Patent No. 6688275 is known.

A vehicle battery pack protection structure is a battery pack including battery stacks and the like, and includes a battery pack storage container that stores the battery pack. The battery pack storage container includes a storage container that stores the battery pack, and frames that support peripheral portions of the storage container.

Regarding the battery pack, the storage container is disposed in a storage space provided on a rear floor of a vehicle, and the frames are coupled to a vehicle body around the storage space. The battery stacks are stored in the storage container having a substantial box shape. Each connection terminal of the battery stack is connected to a junction box or a battery control unit (BCU), which is an electronic equipment, via an electric wiring.

Japanese Unexamined Patent Application Publication (JP-A) No. 2013-120690, JP-A No. 2006-185894, JP-A No. 2019-160774, and JP-A No. 2014-29797 describe configurations for cooling a battery stack inside a battery pack.

SUMMARY

An aspect of the disclosure provides a battery cover for covering a battery stack stored in a battery pack. The battery cover includes a first cover member, a second cover member, a reinforcement, a gas exhaust passage, and an air exhaust passage. The first cover member covers the battery stack from above. The second cover member is joined to the first cover member from above. The reinforcement extends along a longitudinal direction of the battery stack, and is disposed between the first cover member and the second cover member. The gas exhaust passage is an air passage through which gas generated from the battery stack is to be discharged. The air exhaust passage is an air passage through which air that has exchanged heat with the battery stack is to be discharged. The gas exhaust passage and the air exhaust passage are provided in gaps among the first cover member, the second cover member, and the reinforcement.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Techniques described in Japanese Patent No. 6688275, JP-A No. 2013-120690, JP-A No. 2006-185894, JP-A No. 2019-160774, and JP-A No. 2014-29797 have room for improvement in view of cooling efficiency and collision safety.

For example, in the documents described above, a cooling structure for cooling a battery and a protection structure for protecting the battery from an impact due to a vehicle collision are provided as separate members. Accordingly, providing the cooling structure and the protection structure to the battery pack leads to complication, an increase in size, an increase in cost, and the like of the battery pack.

Further, in the battery pack, an air passage through which air that has cooled the battery flows and an air passage through which gas generated from the battery flows are disposed at separate positions. Such a configuration causes complication and the like of the battery pack.

It is desirable to provide a battery cover including air passages for cooling a battery and capable of enhancing the rigidity of a battery pack.

Hereinafter, a battery pack 10 according to an embodiment of the disclosure will be described in detail based on the drawings. The following description uses a front-rear direction, an up-down direction, and a left-right direction, where the left-right direction is a direction of a vehicle 11 as viewed from the rear. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
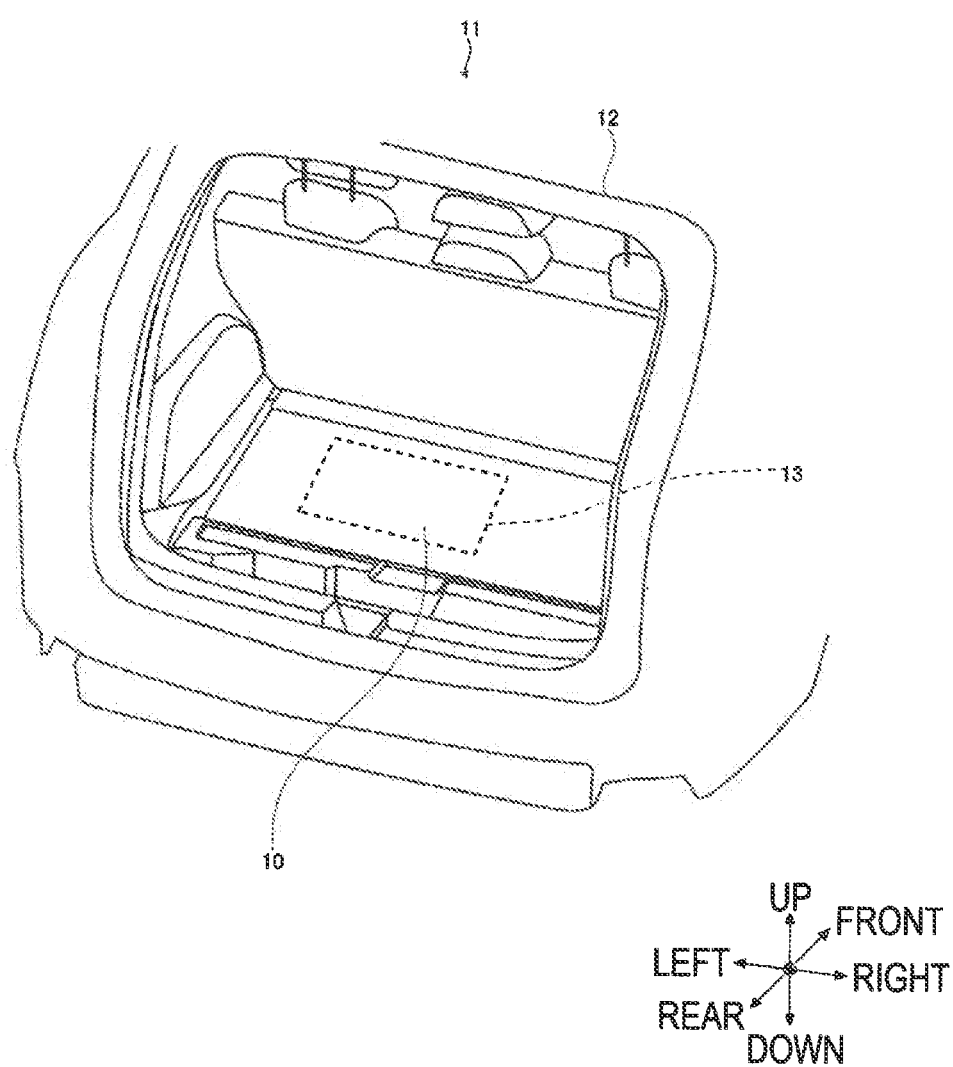
FIG. 1 is a perspective view illustrating a rear portion of a vehicle including a battery pack according to an embodiment of the disclosure.

FIG. 1 is a perspective view illustrating a rear portion of the vehicle 11 including the battery pack 10.

The vehicle 11 is, for example, an automobile, a train, or the like, and is mounted with the battery pack 10 for supplying electric power to a motor or an electrical component mounted on a vehicle body 12. The vehicle 11 is, for example, an electrical vehicle (EV), a hybrid electrical vehicle (HEV), or a plug-in hybrid electrical vehicle (PHEV). The vehicle 11 is mounted with the battery pack 10 having a high power storage function.

The battery pack 10 is disposed in a storage space 13 that is provided under a rear floor.

Figure 2:
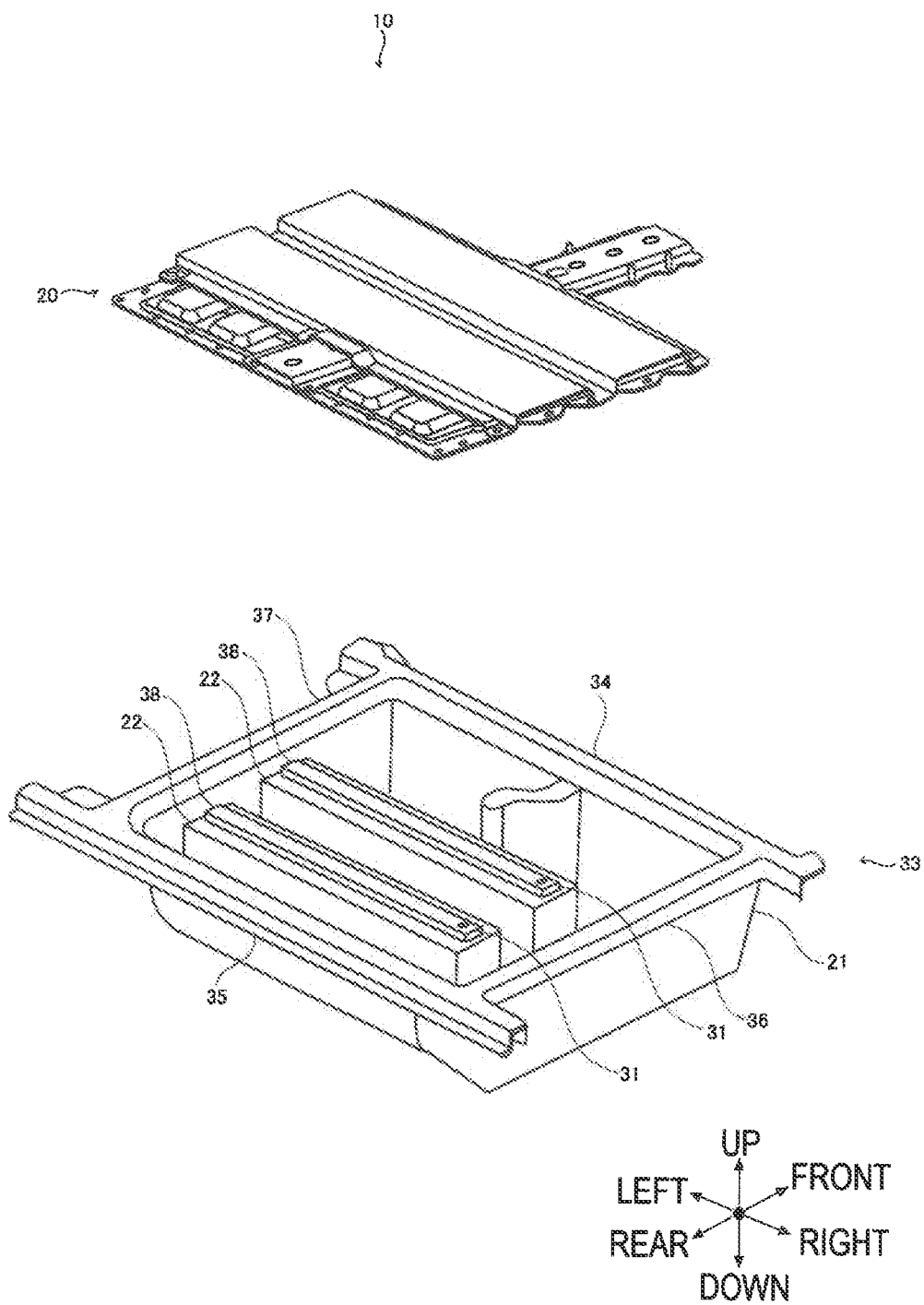
FIG. 2 is an exploded perspective view illustrating the battery pack according to the embodiment of the disclosure.

FIG. 2 is an exploded perspective view illustrating the battery pack 10.

The battery pack 10 mainly includes battery stacks 22, a battery case 21, and a battery cover 20. The battery cover 20 closes an upper opening of the battery case 21. Here, the battery cover 20 is illustrated in a way of being apart from an upper side of the battery case 21.

The battery stack 22 includes battery cells coupled to each other. The battery cell is, for example, a secondary battery such as a nickel hydrogen battery or a lithium ion battery. The battery cells have, for example, a rectangular flat plate shape, and are arranged at substantially equal intervals with a gap therebetween along a longitudinal direction of the battery stack 22, that is, a left-right direction. Here, two battery stacks 22 are arranged in parallel inside the battery case 21. A gas exhaust passage portion 38 is disposed on an upper portion of the battery stack 22. The gas exhaust passage portion 38 is a substantially pipe line-shaped member. Gas exhaust valves of the battery cells constituting the battery stack 22 are coupled to a lower surface of the gas exhaust passage portion 38. An upper surface of the gas exhaust passage portion 38 has a gas exhaust opening 31 near a right end thereof. The gas exhaust opening 31 is coupled to a gas exhaust port 232 of the battery cover 20, which will be described later. Electrical components and the like (not illustrated) are disposed in an internal front side of the battery case 21.

The battery case 21 is made of a steel plate, a synthetic resin plate, or the like, has an approximately box shape, and opens upward.

A frame 33 is a rigid member coupled to an upper edge of the battery case 21. The frame 33 includes a front frame 34, a rear frame 35, a left frame 37, and a right frame 36. When the frame 33 is viewed from above, the frame 33 is a member like a rectangular frame. The frame 33 is made of a steel plate or the like bent into a predetermined shape.

The battery cover 20 is a substantially plate-shaped member that covers the battery stacks 22 stored in the battery pack 10. The battery cover 20 closes the upper opening of the battery case 21. In this way, the battery stack 22 is stored in a substantially closed space surrounded by the battery case 21 and the battery cover 20. A detailed configuration of the battery cover 20 will be described later with reference to FIG. 3.

Figure 3:
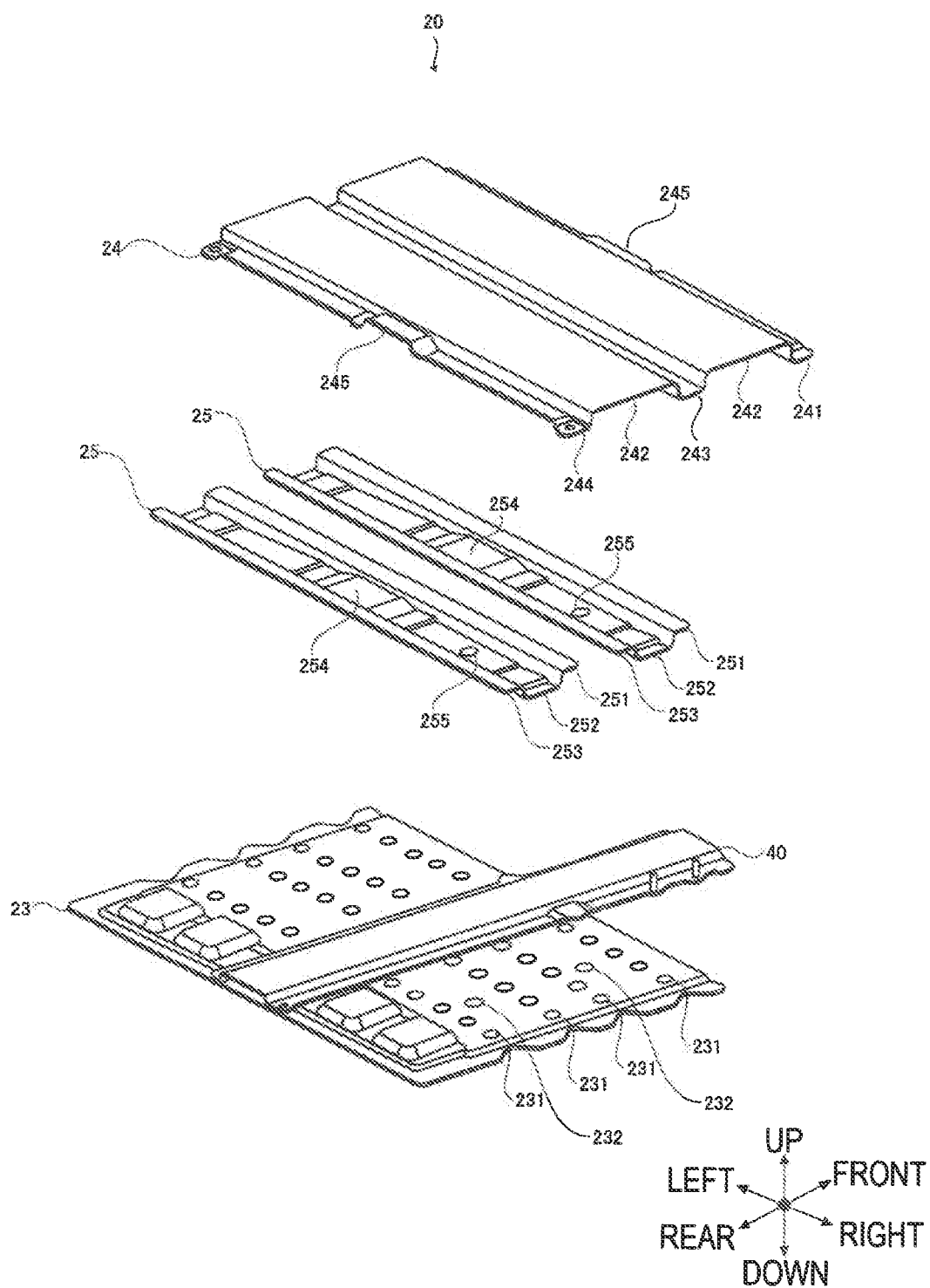
FIG. 3 is an exploded perspective view illustrating a battery cover according to the embodiment of the disclosure.

FIG. 3 is an exploded perspective view illustrating the battery cover 20.

The battery cover 20 includes a first cover member 23, a second cover member 24, reinforcements 25, gas exhaust passages 26, and air exhaust passages 27. The gas exhaust passage 26 and the air exhaust passage 27 will be described later with reference to FIG. 4A and the like. A cover frame 40 is disposed on an upper surface of the first cover member 23.

The first cover member 23 covers the battery stack 22 from above. The first cover member 23 is made of a steel plate having a substantially rectangular shape when viewed from above. The first cover member 23 has exhaust ports 231 and gas exhaust ports 232. The first cover member 23 may also be referred to as a cover battery box or the like.

The exhaust port 231 is an opening through which air that has exchanged heat with the battery stack 22 described above, for example, air that has cooled the battery stack 22 passes. When viewed from above, the exhaust port 231 has, for example, a substantially circular shape. The exhaust ports 231 are arranged in rows at substantially equal intervals along the left-right direction. Four rows of the exhaust ports 231 are arranged in a front-rear direction. With reference to FIG. 2, air that has cooled the battery stack 22 disposed in the rear passes through the two rows of the exhaust ports 231 arranged in the rear. With reference to FIG. 2, air that has cooled the battery stack 22 disposed in the front passes through the two rows of the exhaust ports 231 arranged in the front.

The gas exhaust port 232 having a substantially circular shape opens at a right end of the first cover member 23. Here, two gas exhaust ports 232 are provided. With reference to FIG. 2, gas generated from the battery stack 22 disposed in the rear passes through the gas exhaust port 232 disposed in the rear. With reference to FIG. 2, gas generated from the battery stack 22 disposed in the front passes through the gas exhaust port 232 disposed in the front. Here, gas is generated from the battery stack 22, for example, when a collision accident occurs.

The second cover member 24 is a substantially plate-shaped member made of a steel plate or the like and is joined to the first cover member 23 from above. The second cover member 24 constitutes an upper portion of the battery cover 20. The second cover member 24 is joined to the first cover member 23 by, for example, welding. Further, since the second cover member 24 has recesses and protrusions as described below, the battery cover 20 and the battery pack 10 can be prevented from being deformed when an impact is applied from each of the left and right directions. The second cover member 24 may also be referred to as a cover battery cross member or the like.

For example, the second cover member 24 includes, from the front, a front flat portion 241, a protrusion portion 242, a central flat portion 243, a protrusion portion 242, and a rear flat portion 244. The front flat portion 241, the central flat portion 243, and the rear flat portion 244 are substantially flat portions, and are joined to the first cover member 23 by welding or the like. The protrusion portion 242 has a cross-sectional shape protruding upward in a substantially hat shape. With reference to FIG. 2, the protrusion portions 242 are disposed above the two battery stacks 22, respectively.

Raised portions 245 are raised upward at intermediate portions, in the left-right direction, of the front flat portion 241, the central flat portion 243, and the rear flat portion 244. The cover frame 40, which will be described later, is disposed in the raised portion 245.

The reinforcement 25 extends along the longitudinal direction of the battery stack 22 illustrated in FIG. 2, and is disposed between the first cover member 23 and the second cover member 24. The reinforcement 25 is made of a steel plate or the like bent into a predetermined shape. Here, the two reinforcements 25 are disposed side by side in the front-rear direction, and the reinforcements 25 are disposed above the battery stacks 22 illustrated in FIG. 2, respectively. Since the reinforcement 25 has recess and protrusions, the battery cover 20 and the battery pack 10 can be prevented from being deformed when an impact is applied from each of the left and right directions.

For example, the reinforcement 25 includes a front flat portion 251, a recess portion 252, and a rear flat portion 253. The front flat portion 251 and the rear flat portion 253 are substantially flat, and are joined to the protrusion portion 242 of the second cover member 24. The recess portion 252 protrudes downward in a substantially hat shape, and is in close contact with the upper surface of the first cover member 23. A gas exhaust port 255 having a substantially circular shape opens in the vicinity of a right end of the recess portion 252, and overlaps with the gas exhaust port 232 of the first cover member 23. The gas exhaust port 255 is an opening through which gas generated from the battery stack 22 described above passes.

A raised portion 254 is raised upward at an intermediate portion of the recess portion 252. The cover frame 40, which will be described later, is disposed in the raised portion 254.

The cover frame 40 extends along the front-rear direction, has a substantially hat-shaped cross-sectional shape, and a rear portion thereof is joined to the upper surface of the first cover member 23. A front end of the cover frame 40 is joined to the front frame 34 illustrated in FIG. 2, and a rear end of the cover frame 40 is joined to the rear frame 35. The cover frame 40 can prevent the battery cover 20 and the battery pack 10 from being deformed when an impact is applied from each of the front and rear directions.

Figure 4A:
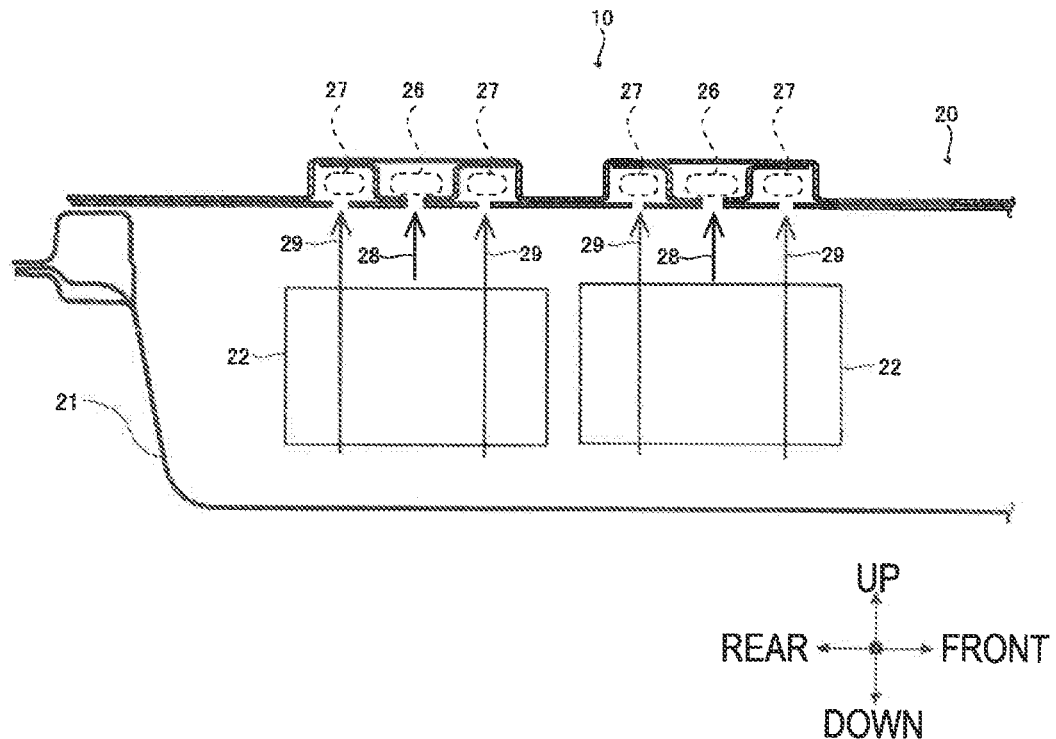
FIG. 4A is a cross-sectional view partially illustrating the battery pack according to the embodiment of the disclosure.
Figure 4B:
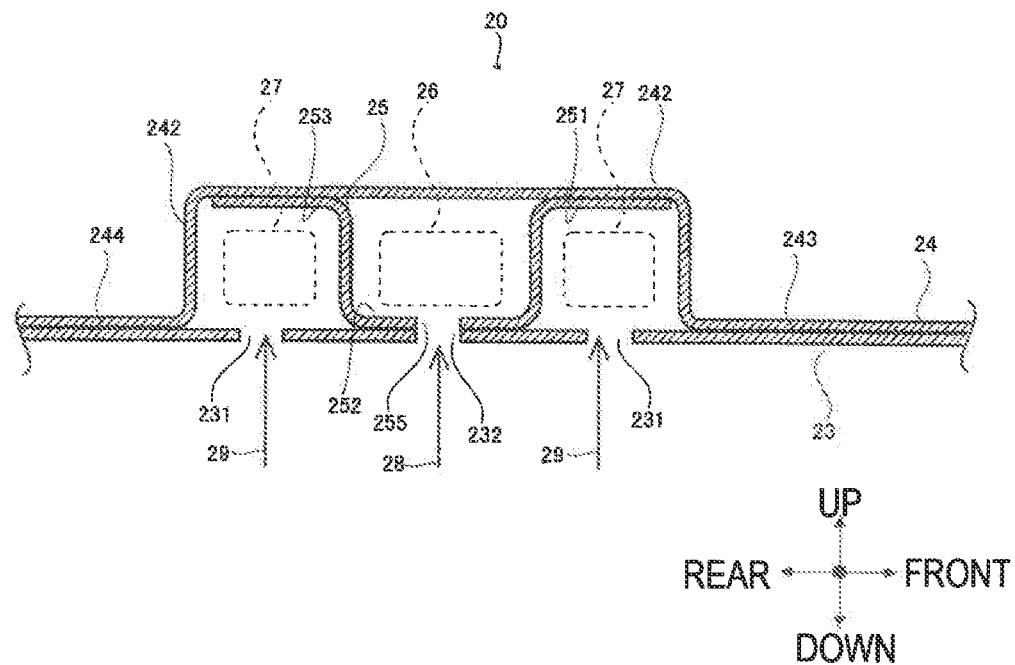
FIG. 4B is a cross-sectional view partially illustrating the battery cover according to the embodiment of the disclosure.

FIG. 4A is a cross-sectional view partially illustrating the battery pack 10. FIG. 4B is a cross-sectional view partially illustrating the battery cover 20.

With reference to FIG. 4A, the gas exhaust passages 26 and the air exhaust passages 27 are provided in gaps among the first cover member 23, the second cover member 24, and the reinforcements 25. Here, the gas exhaust passage 26 is an air passage through which gas 26 generated from the battery stack 22 is discharged, and the air exhaust passage 27 is an air passage through which air 29 that has exchanged heat with the battery stack 22 is discharged.

With reference to FIG. 4B, a bottom surface of the recess portion 252 of the reinforcement 25 is in close contact with the upper surface of the first cover member 23 by welding. The front flat portion 251 and the rear flat portion 253 of the reinforcement 25 are in close contact with a lower surface of the protrusion portion 242 of the second cover member 24 by welding.

With this configuration, the gas exhaust passage 26 is provided between the reinforcement 25 and the second cover member 24, and the air exhaust passage 27 is provided between the first cover member 23 and the second cover member 24. For example, the air exhaust passage 27 is a space surrounded by the first cover member 23, the protrusion portion 242, and the reinforcement 25. The air exhaust passage 27 communicates with an internal space of the battery pack 10 via the exhaust port 231. The gas exhaust passage 26 is a space surrounded by the recess portion 252 of the reinforcement 25 and the protrusion portion 242 of the second cover member 24. The gas exhaust passage 26 communicates with the gas exhaust opening 31 of the gas exhaust passage portion 38 illustrated in FIG. 2 via the gas exhaust port 232 and the gas exhaust port 255. Further, with this configuration, the air exhaust passage 27 and the gas exhaust passage 26 do not communicate with each other inside the battery cover 20. Accordingly, the gas 28 flowing into the gas exhaust passage 26 is prevented from entering the air exhaust passage 27.

With reference to FIG. 4A, while the battery stack 22 is being discharged or charged, the air 29 is blown into the battery pack 10 by a blower (not illustrated). For example, the air 29 cooled in a vehicle cabin of the vehicle 11 is blown to the battery pack 10. The air 29 blown into the battery pack 10 is heated by cooling the battery cells of the battery stack 22, flows into the air exhaust passage 27, and is then discharged to the outside of the battery pack 10.

On the other hand, when the gas 28 is generated from the battery stack 22 due to a cause such as a collision accident, the gas 28 flows into the gas exhaust passage 26 via the gas exhaust passage portion 38 and the gas exhaust opening 31 illustrated in FIG. 2, and further via the gas exhaust port 255 and the gas exhaust port 232 illustrated in FIG. 4B. Thereafter, the gas 28 is discharged to the outside of the battery pack 10 via the gas exhaust passage 26.

Figure 5:
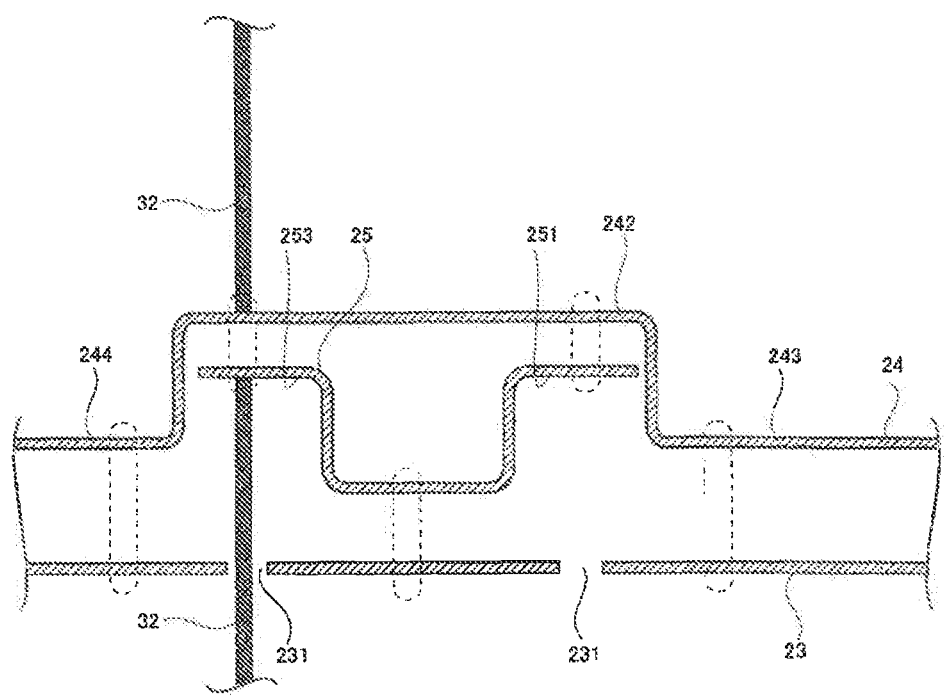
FIG. 5 is a cross-sectional view illustrating a method for manufacturing the battery cover according to the embodiment of the disclosure.
Figure 5:
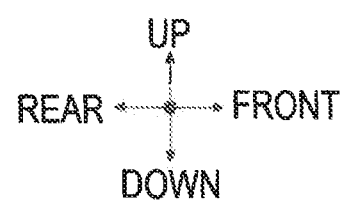

FIG. 5 is a cross-sectional view illustrating a process of joining the second cover member 24 and the reinforcement 25 by spot welding in a method for manufacturing the battery cover 20.

In manufacturing of the battery cover 20, first, the first cover member 23, the reinforcement 25, and the second cover member 24 are disposed to be stacked. By performing the spot welding in this state, the first cover member 23, the second cover member 24, and the reinforcement 25 are joined. Here, portions where the spot welding is performed are surrounded by dotted lines.

Here, the exhaust port 231 in the first cover member 23 has a shape and a size that allow a welding jig 32 to be inserted. That is, the width of the exhaust port 231 is larger than the width of the jig 32. Accordingly, the welding jig 32 can be inserted from the exhaust port 231, and an upper end of the jig 32 can be brought into contact with a lower surface of the rear flat portion 253. That is, the exhaust port 231 is a blowing port through which air that has cooled the battery stack 22 passes, and is also a work hole used at the time of welding.

At the same time, the jig 32 on the other side is brought into contact with an upper surface of the protrusion portion 242. An upper surface of the rear flat portion 253 of the reinforcement 25 is brought into close contact with the lower surface of the protrusion portion 242 of the second cover member 24. By applying a high voltage to the jig 32 in this state, the reinforcement 25 and the second cover member 24 are joined by the spot welding.

Figure 6A:
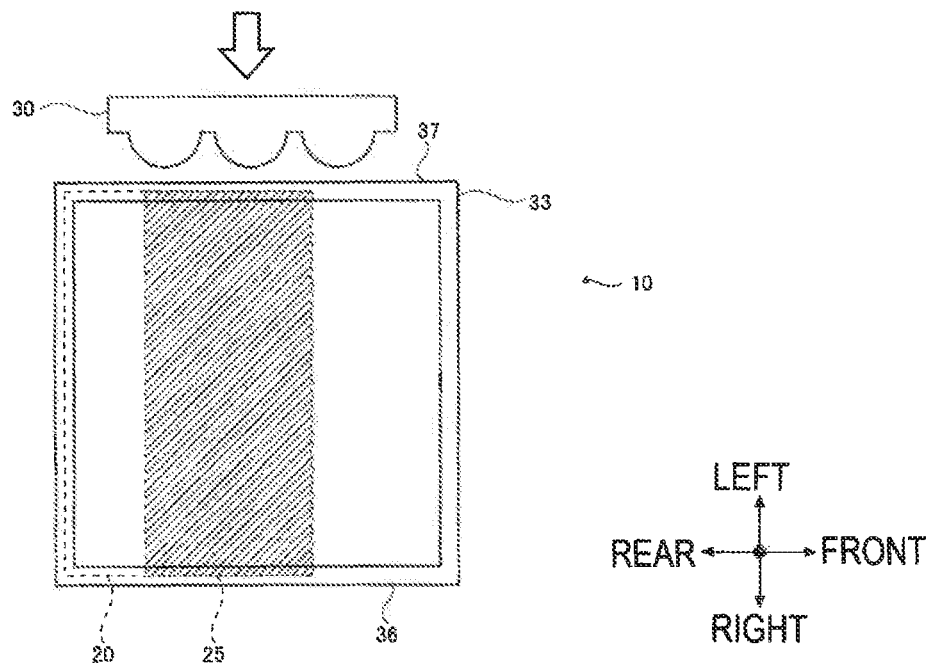
FIG. 6A is a top view illustrating a situation in which an impact is applied to the battery pack according to the embodiment of the disclosure from left.

FIG. 6A is a top view illustrating a situation in which an impact is applied to the battery pack 10 from the left.

As described above, the frame 33 includes the left frame 37 and the right frame 36. With reference to FIG. 3, a left end and a right end of the first cover member 23 constituting the battery pack 10 are joined to the left frame 37 and the right frame 36, respectively. A left end and a right end of the reinforcement 25 are joined to the left frame 37 and the right frame 36, respectively. Further, a left end and a right end of the second cover member 24 are joined to the left frame 37 and the right frame 36, respectively. That is, left ends and right ends of the members constituting the battery cover 20 are joined to the left frame 37 and the right frame 36.

Further, as illustrated in FIG. 4B, the cross section of the battery cover 20 has a cross-sectional shape in which the first cover member 23, the second cover member 24, and the reinforcement 25 are joined to each other at multiple positions. With this configuration, rigidity of the battery cover 20 is reinforced.

Accordingly, when a pusher 30 abuts against the battery pack 10 from the left in order to check impact resistance of the battery pack 10 from the left, the impact is alleviated and absorbed by the members of the battery cover 20. Accordingly, the battery pack 10 is not largely deformed, and the battery stack 22 illustrated in FIG. 2 is prevented from being damaged.

Figure 6B:
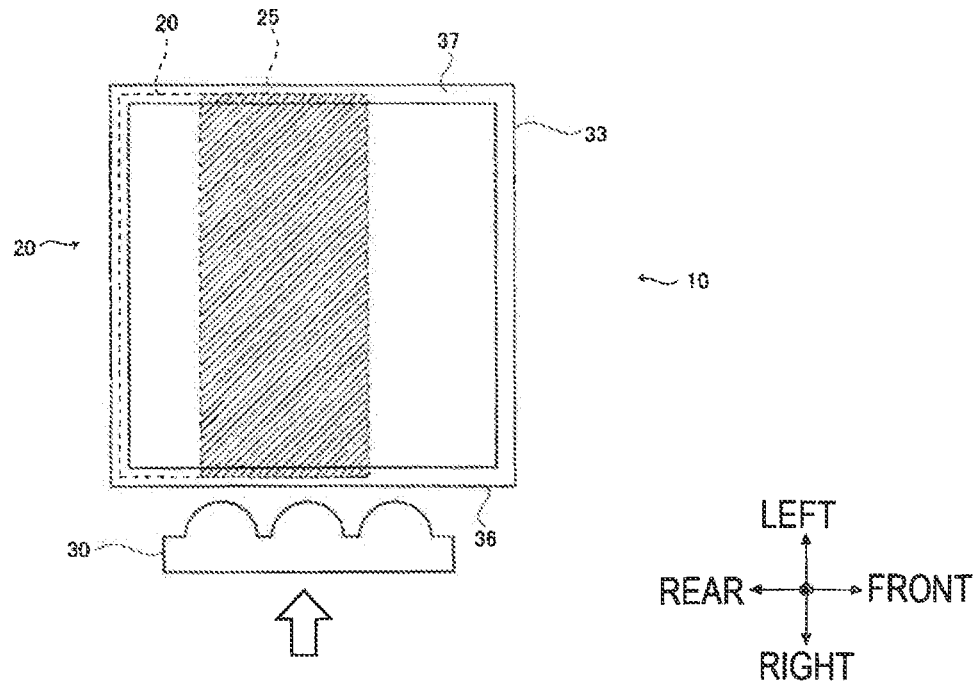
FIG. 6B is a top view illustrating a situation in which an impact is applied to the battery pack according to the embodiment of the disclosure from right.

FIG. 6B is a top view illustrating a situation in which an impact is applied to the battery pack 10 from the right. In this case, when the pusher 30 abuts against the battery pack 10 from the right, the impact is also alleviated and absorbed by the members of the battery cover 20. Accordingly, the battery pack 10 is not largely deformed, and the battery stack 22 illustrated in FIG. 2 is prevented from being damaged.

The embodiment described above provides the following main effects.

With reference to FIG. 2, since the battery pack 10 includes the reinforcements 25, the battery cover 20 itself has high rigidity. Accordingly, the rigidity of the entire battery pack 10 including the battery cover 20 can be increased, and the battery stack 22 can be protected from a collision impact or the like. Further, by forming the gas exhaust passage 26 and the air exhaust passage 27 inside the battery cover 20, it is not necessary to separately dispose a gas exhaust duct or an exhaust duct, and an entire configuration of the battery pack 10 can be simplified.

With reference to FIG. 4B, the gap between the first cover member 23 and the second cover member 24 is relatively large. Using the gap as the air exhaust passage 27 facilitates ventilation in the air exhaust passage 27, which can effectively cool the battery stack 22.

With reference to FIG. 4B, openings are formed in the first cover member 23 and the reinforcement 25 which are in close contact with each other, to form the gas exhaust port 255 and the gas exhaust port 232, whereby the gas 28 can be prevented from flowing into the air exhaust passage 27.

With reference to FIG. 5, in the manufacturing process of the battery cover 20, the welding jig 32 can be inserted from the exhaust port 231, and the second cover member 24 and the reinforcement 25 can be welded by the jig 32. That is, it is not necessary to form a hole dedicated to welding in the first cover member 23.

With reference to FIG. 6A, members constituting the battery cover 20, such as the reinforcement 25, are coupled to the frame 33, thereby making it possible to notably reinforce the rigidity of the battery pack 10.

Although the embodiments of the disclosure have been described above, the disclosure is not limited thereto, and modifications may be made within the gist of the disclosure. The embodiments described above can be combined with each other.

For example, with reference to FIG. 4B, the gas exhaust passage 26 and the air exhaust passage 27 can be replaced with each other. That is, the air exhaust passage 27 may be provided at a central portion of the protrusion portion 242, and the gas exhaust passages 26 may be provided at both ends of the air exhaust passage 27.

With reference to FIG. 1, the battery pack 10 is not limited to being disposed in the storage space 13 below the rear floor, but may be disposed in a storage space below a front floor on which a driver seat and a passenger seat of the vehicle 11 are disposed.

Further, in the above description, the constituent members constituting the battery cover 20 are joined to each other by welding, but the constituent members may be joined to each other by other joining forms such as fastening.

The invention claimed is:

1. A battery cover for covering a battery stack stored in a battery pack, the battery cover comprising:
    a first cover member;
    a second cover member;
    a reinforcement;
    a gas exhaust passage; and
    an air exhaust passage,
    wherein the first cover member covers the battery stack from above,
    wherein the second cover member is joined to the first cover member from above,
    wherein the reinforcement extends along a longitudinal direction of the battery stack, and is disposed between the first cover member and the second cover member,
    wherein the gas exhaust passage is an air passage through which gas generated from the battery stack is to be discharged,
    wherein the air exhaust passage is an air passage through which air that has exchanged heat with the battery stack is to be discharged,
    wherein the second cover member includes a protrusion portion having a cross-sectional shape protruding upward in a hat shape,
    wherein the reinforcement includes a recess portion having a cross-sectional shape protruding downward in a hat shape, the recess portion being in close contact with an upper surface of the first cover member, and
    wherein the gas exhaust passage and the air exhaust passage are provided in gaps among the first cover member, the second cover member, and the reinforcement.

2. The battery cover according to claim 1, wherein
    the gas exhaust passage is provided between the reinforcement and the second cover member, and
    the air exhaust passage is provided between the first cover member and the second cover member.

3. The battery cover according to claim 2, wherein
    the first cover member has an exhaust port through which the air that has exchanged the heat with the battery stack flows into the air exhaust passage,
    the exhaust port opens into the air exhaust passage,
    a gas exhaust port through which the gas generated from the battery stack is to flow into the gas exhaust passage passes through the first cover member and the reinforcement that are in close contact with each other, and
    the gas exhaust port opens into the gas exhaust passage.

4. The battery cover according to claim 3, wherein the exhaust port has a size that allows a welding jig to be inserted.

5. The battery cover according to claim 1, wherein
    the battery pack comprises a frame disposed outside the battery stack, and
    an end of the reinforcement is coupled to the frame.

6. The battery cover according to claim 2, wherein
    the battery pack comprises a frame disposed outside the battery stack, and
    an end of the reinforcement is coupled to the frame.

7. The battery cover according to claim 3, wherein
    the battery pack comprises a frame disposed outside the battery stack, and
    an end of the reinforcement is coupled to the frame.

8. The battery cover according to claim 4, wherein
    the battery pack comprises a frame disposed outside the battery stack, and
    an end of the reinforcement is coupled to the frame.

9. The battery cover according to claim 1, wherein the reinforcement further includes a front flat portion and a rear flat portion, with the recess portion disposed between the front flat portion and the rear flat portion.

10. The battery cover according to claim 9, wherein the front flat portion and the rear flat portion of the reinforcement are joined to the protrusion portion of the second cover member by welding.

11. The battery cover according to claim 1, wherein the gas exhaust passage is surrounded by the recess portion of the reinforcement and the protrusion portion of the second cover member.

12. The battery cover according to claim 11, wherein the gas exhaust passage communicates with a gas exhaust opening of a gas exhaust passage portion disposed on an upper portion of the battery stack.

13. The battery cover according to claim 1, wherein the air exhaust passage is surrounded by the first cover member, the protrusion portion of the second cover member, and the reinforcement, and is configured to receive air that has cooled the battery stack.

14. The battery cover according to claim 1, wherein the gas exhaust passage and the air exhaust passage are configured such that gas flowing into the gas exhaust passage is prevented from entering the air exhaust passage inside the battery cover.

15. The battery cover according to claim 1, wherein the second cover member includes, from front to rear, a front flat portion, the protrusion portion, a central flat portion, another protrusion portion, and a rear flat portion.

16. The battery cover according to claim 15, wherein the front flat portion, the central flat portion, and the rear flat portion are joined to the first cover member by welding.

17. The battery cover according to claim 15, wherein raised portions are provided at intermediate portions, in a left-right direction, of the front flat portion, the central flat portion, and the rear flat portion, and are configured to receive a cover frame.

18. The battery cover according to claim 1, further comprising a cover frame extending along a front-rear direction and having a hat-shaped cross-sectional shape, wherein a rear portion of the cover frame is joined to the upper surface of the first cover member.

19. The battery cover according to claim 18, wherein the battery pack comprises a front frame and a rear frame,
wherein a front end of the cover frame is joined to the front frame, and
wherein a rear end of the cover frame is joined to the rear frame.

20. A battery cover for covering a battery stack stored in a battery pack, the battery cover comprising:
a first cover member;
a second cover member;
a reinforcement;
a gas exhaust passage; and
an air exhaust passage,
wherein the first cover member covers the battery stack from above,
wherein the second cover member is joined to the first cover member from above,
wherein the reinforcement extends along a longitudinal direction of the battery stack, and is disposed between the first cover member and the second cover member,
wherein the gas exhaust passage is an air passage through which gas generated from the battery stack is to be discharged,
wherein the air exhaust passage is an air passage through which air that has exchanged heat with the battery stack is to be discharged,
wherein the gas exhaust passage and the air exhaust passage are provided in gaps among the first cover member, the second cover member, and the reinforcement,
wherein the gas exhaust passage is provided between the reinforcement and the second cover member,
wherein the air exhaust passage is provided between the first cover member and the second cover member,
wherein the first cover member has an exhaust port through which the air that has exchanged the heat with the battery stack flows into the air exhaust passage,
wherein the exhaust port opens into the air exhaust passage,
wherein a gas exhaust port through which the gas generated from the battery stack is to flow into the gas exhaust passage passes through the first cover member and the reinforcement that are in close contact with each other,
wherein the gas exhaust port opens into the gas exhaust passage, and
wherein the exhaust port has a size that allows a welding jig to be inserted.

* * * * *